US011156025B2

United States Patent
Mani et al.

(10) Patent No.: US 11,156,025 B2
(45) Date of Patent: Oct. 26, 2021

(54) LATCHBOLT DAMPING MODULE

(71) Applicant: Schlage Lock Company LLC, Carmel, IN (US)

(72) Inventors: Vijayakumar Mani, Bangalore (IN); Paul R. Arlinghaus, Fishers, IN (US); Saagar Mohammed, Alappuzha (IN)

(73) Assignee: Schlage Lock Company LLC, Carmel, IN (US)

( * ) Notice: Subject to any disclaimer, the term of this patent is extended or adjusted under 35 U.S.C. 154(b) by 618 days.

(21) Appl. No.: 16/027,529

(22) Filed: Jul. 5, 2018

(65) Prior Publication Data
US 2020/0011100 A1  Jan. 9, 2020

(51) Int. Cl.
*E05C 21/00* (2006.01)
*F16H 19/04* (2006.01)
*E05C 3/16* (2006.01)
*E05C 3/00* (2006.01)

(52) U.S. Cl.
CPC .............. *E05C 21/00* (2013.01); *E05C 3/008* (2013.01); *E05C 3/162* (2013.01); *F16H 19/04* (2013.01)

(58) Field of Classification Search
CPC .......... E05C 21/00; E05C 3/008; E05C 3/162; E05C 3/36; F16H 19/04; Y10T 292/0908; Y10T 292/0909; Y10T 292/091; Y10S 292/65; E05B 17/0041; E05B 77/142;
(Continued)

(56) References Cited

U.S. PATENT DOCUMENTS 2,006,922 A   7/1935 Jacobi
2,098,776 A   11/1937 Edwards
(Continued)

FOREIGN PATENT DOCUMENTS

DE    102008027623 A1 * 12/2009  ............... F16F 9/12
EP       0771971 A1 *  5/1997  ............... E05F 5/00
(Continued)

OTHER PUBLICATIONS

Canadian Office Action; Canadian Intellectual Property Office; Canadian Patent Application No. 3,048,701; dated Dec. 3, 2020; 4 pages.

*Primary Examiner* — Kristina R Fulton
*Assistant Examiner* — Steven A Tullia
(74) *Attorney, Agent, or Firm* — Taft Stettinius & Hollister LLP (57) ABSTRACT

An exemplary damper module is configured for use with a latchbolt assembly, and generally includes a mounting bracket, a first slowing mechanism, and a second slowing mechanism. The latchbolt assembly generally includes a drive member, a latchbolt, and a retractor connected between the drive member and the latchbolt. Each of the slowing mechanisms is independently operable to slow the extension speed of the latchbolt. The first slowing mechanism includes a rack gear and a rotary damper including a pinion gear. The rack gear is configured to be mounted to the drive member, and the rotary damper is mounted to the mounting bracket. The second slowing mechanism includes a slowing arm and a biasing member engaged with the slowing arm. The slowing arm is movably mounted to the mounting bracket and is configured to engage the retractor.

20 Claims, 8 Drawing Sheets

(58) Field of Classification Search
CPC .. E05B 65/10; E05B 65/1033; E05B 63/0069; E05B 65/1086; E05B 2047/0086
USPC ............................................................. 70/92
See application file for complete search history.

(56) References Cited

U.S. PATENT DOCUMENTS

| | | | | |
|---|---|---|---|---|
| 4,513,473 A * | 4/1985 | Omata | ...................... | E05F 3/14 16/82 |
| 4,574,423 A * | 3/1986 | Ito | ............................ | E05F 3/14 16/342 |
| 4,872,716 A | 10/1989 | Legrand et al. | | |
| 4,875,722 A * | 10/1989 | Miller | ................ | E05B 65/1073 292/92 |
| 5,011,199 A | 4/1991 | Lowe et al. | | |
| 5,067,757 A | 11/1991 | Cohrs et al. | | |
| 5,129,879 A | 7/1992 | Mattson | | |
| 5,839,548 A * | 11/1998 | Parker | ...................... | B60R 7/06 188/82.1 |
| 5,887,930 A * | 3/1999 | Klein | .................... | B62D 25/12 296/37.12 |
| 6,598,913 B2 * | 7/2003 | Meinke | ................. | E05B 85/107 292/336.3 |
| 6,820,905 B1 | 11/2004 | Haeck et al. | | |
| 6,854,773 B2 * | 2/2005 | Lin | ...................... | E05B 65/104 292/92 |
| 7,287,784 B2 * | 10/2007 | Lin | ...................... | E05B 65/102 292/92 |
| 8,182,003 B2 * | 5/2012 | Dye | .................... | E05B 65/1053 292/92 |
| 8,267,441 B2 * | 9/2012 | Lin | ......................... | E05B 53/00 292/92 |
| 8,272,167 B2 | 9/2012 | Sato | | |
| D670,303 S * | 11/2012 | Shimozaki | ................ | E05F 3/14 D14/483 |
| 8,495,836 B2 | 7/2013 | Lowder et al. | | |
| 8,523,248 B2 * | 9/2013 | Tien | ...................... | E05B 65/104 292/194 |
| 10,030,411 B2 * | 7/2018 | Coleman | .............. | E05B 65/1053 |
| 10,577,832 B2 * | 3/2020 | Blanchard | ........... | E05B 65/1093 |
| 2004/0070213 A1 * | 4/2004 | Vitry | ....................... | E05B 77/04 292/110 |
| 2005/0023089 A1 * | 2/2005 | Okabayashi | .............. | E05F 5/06 188/82.2 |
| 2007/0246947 A1 * | 10/2007 | Banks | ..................... | E05B 57/00 292/93 |
| 2008/0224370 A1 * | 9/2008 | Derr | .......................... | E05F 5/06 267/195 |
| 2010/0007154 A1 * | 1/2010 | Schacht | .............. | E05B 65/1053 292/92 |
| 2010/0026012 A1 | 2/2010 | Lin | | |
| 2012/0032455 A1 | 2/2012 | Lin | | |
| 2012/0233812 A1 * | 9/2012 | Bienek | ................ | F16K 31/0627 16/60 |
| 2012/0248808 A1 * | 10/2012 | Bone | ...................... | E05B 77/06 296/37.1 |
| 2012/0256428 A1 * | 10/2012 | Tien | ...................... | E05B 65/1053 292/92 |
| 2013/0001960 A1 * | 1/2013 | Tien | .................... | E05B 17/2003 292/96 |
| 2015/0035298 A1 * | 2/2015 | Yokoo | .................... | E05B 1/0053 292/336.3 |
| 2016/0333621 A1 | 11/2016 | Lehner, Jr. et al. | | |
| 2016/0340942 A1 | 11/2016 | Anderson et al. | | |
| 2018/0128015 A1 * | 5/2018 | Shah | ................... | E05B 17/0045 |
| 2018/0148955 A1 * | 5/2018 | Yalamati | ............. | E05B 65/1046 |

FOREIGN PATENT DOCUMENTS

| | | | | |
|---|---|---|---|---|
| WO | WO-9951838 A1 * | 10/1999 | ......... | E05B 65/1053 |
| WO | 2000050710 A1 | 8/2000 | | |

* cited by examiner

LATCHBOLT DAMPING MODULE

TECHNICAL FIELD

The present disclosure generally relates to the reduction of the noise generated during the operation of door hardware, and more particularly but not exclusively relates to systems and methods for reducing the amount of noise generated during the operation of exit devices.

BACKGROUND

Acoustic noise is becoming a growing concern in many different environments, including theaters, auditoriums, schools, libraries, and healthcare settings. Noise is of particular concern in healthcare settings, such as hospitals, nursing homes, and mental health facilities. In healthcare settings, a loud environment can affect the sleep of patients, which can be detrimental to their recovery times. Noise is often one of the lowest scoring items on patient surveys, which can lead to lower reimbursements to the medical facility. In addition to disturbing patients, noise can also be distracting or bothersome to the medical staff, and may lead to loss of focus and errors.

In many settings, door hardware can be a significant factor contributing to undesirable environmental noise. When a person enters or exits a room through a door, the hardware can make loud and distracting sounds. Building codes and other regulatory requirements often dictate that certain doors be equipped with exit devices, which can be louder than certain other types of door hardware. While many manufacturers have made efforts to reduce the noise generated by their devices, certain conventional exit devices nonetheless generate noise in excess of the maximum recommended levels set forth in industry guidelines.

It has been found that a significant factor contributing to noise generation is the free return of the latchbolt from its retracted position to its extended position. During this latching movement, the components of the exit device may impact or grind against one another, which may lead to undesirable noise generation. During relatching operations (i.e., where the latchbolt extends to engage the strike) impact and other contact between the latchbolt and the strike can also contribute to noise generation.

As is evident from the foregoing, certain conventional exit devices generate more noise than is desirable in many environments, particularly as the latchbolt moves toward its extended position. For these reasons among others, there remains a need for further improvements in this technological field.

SUMMARY

An exemplary damper module is configured for use with a latchbolt assembly, and generally includes a mounting bracket, a first slowing mechanism, and a second slowing mechanism. The latchbolt assembly generally includes a drive member, a latchbolt, and a retractor connected between the drive member and the latchbolt. Each of the slowing mechanisms is independently operable to slow the extension speed of the latchbolt. The first slowing mechanism includes a rack gear and a rotary damper including a pinion gear. The rack gear is configured to be mounted to the drive member, and the rotary damper is mounted to the mounting bracket. The second slowing mechanism includes a slowing arm and a biasing member engaged with the slowing arm. The slowing arm is movably mounted to the mounting bracket and is configured to engage the retractor. Further embodiments, forms, features, and aspects of the present application shall become apparent from the description and figures provided herewith.

DETAILED DESCRIPTION OF ILLUSTRATIVE EMBODIMENTS

Although the concepts of the present disclosure are susceptible to various modifications and alternative forms, specific embodiments have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. It should further be appreciated that although reference to a "preferred" component or feature may indicate the desirability of a particular component or feature with respect to an embodiment, the disclosure is not so limiting with respect to other embodiments, which may omit such a component or feature. Further, when a particular feature, structure, or characteristic is described in connection with an embodiment, it is submitted that it is within the knowledge of one skilled in the art to implement such feature, structure, or characteristic in connection with other embodiments whether or not explicitly described.

Additionally, it should be appreciated that items included in a list in the form of "at least one of A, B, and C" can mean (A); (B); (C); (A and B); (B and C); (A and C); or (A, B, and C). Similarly, items listed in the form of "at least one of A, B, or C" can mean (A); (B); (C); (A and B); (B and C); (A and C); or (A, B, and C). Further, with respect to the claims, the use of words and phrases such as "a," "an," "at least one," and/or "at least one portion" should not be interpreted so as to be limiting to only one such element unless specifically stated to the contrary, and the use of phrases such as "at least a portion" and/or "a portion" should be interpreted as encompassing both embodiments including only a portion of such element and embodiments including the entirety of such element unless specifically stated to the contrary.

The disclosed embodiments may, in some cases, be implemented in hardware, firmware, software, or a combination thereof. The disclosed embodiments may also be implemented as instructions carried by or stored on one or more transitory or non-transitory machine-readable (e.g., computer-readable) storage media, which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures unless indicated to the contrary. Additionally, the inclusion of a structural or method feature in a particular figure is not meant to imply that such feature is required in all embodiments and, in some embodiments, may not be included or may be combined with other features.

As used herein, the terms "longitudinal," "lateral," and "transverse" are used to denote motion or spacing along three mutually perpendicular axes. In the coordinate system illustrated in FIGS. 1 and 2, the X-axis defines the longitudinal directions, the Y-axis defines first and second transverse directions, and the Z-axis defines first and second lateral directions. Additionally, the longitudinal directions may alternatively be referred to as the proximal direction (to the right in FIG. 2) and the distal direction (to the left in FIG. 2). These terms are used for ease and convenience of description, and are without regard to the orientation of the system with respect to the environment. For example, descriptions that reference a longitudinal direction may be equally applicable to a vertical direction, a horizontal direction, or an off-axis orientation with respect to the environment.

Furthermore, motion or spacing along a direction defined by one of the axes need not preclude motion or spacing along a direction defined by another of the axes. For example, elements which are described as being "laterally offset" from one another may also be offset in the longitudinal and/or transverse directions, or may be aligned in the longitudinal and/or transverse directions. The terms are therefore not to be construed as limiting the scope of the subject matter described herein.

Figure 1:
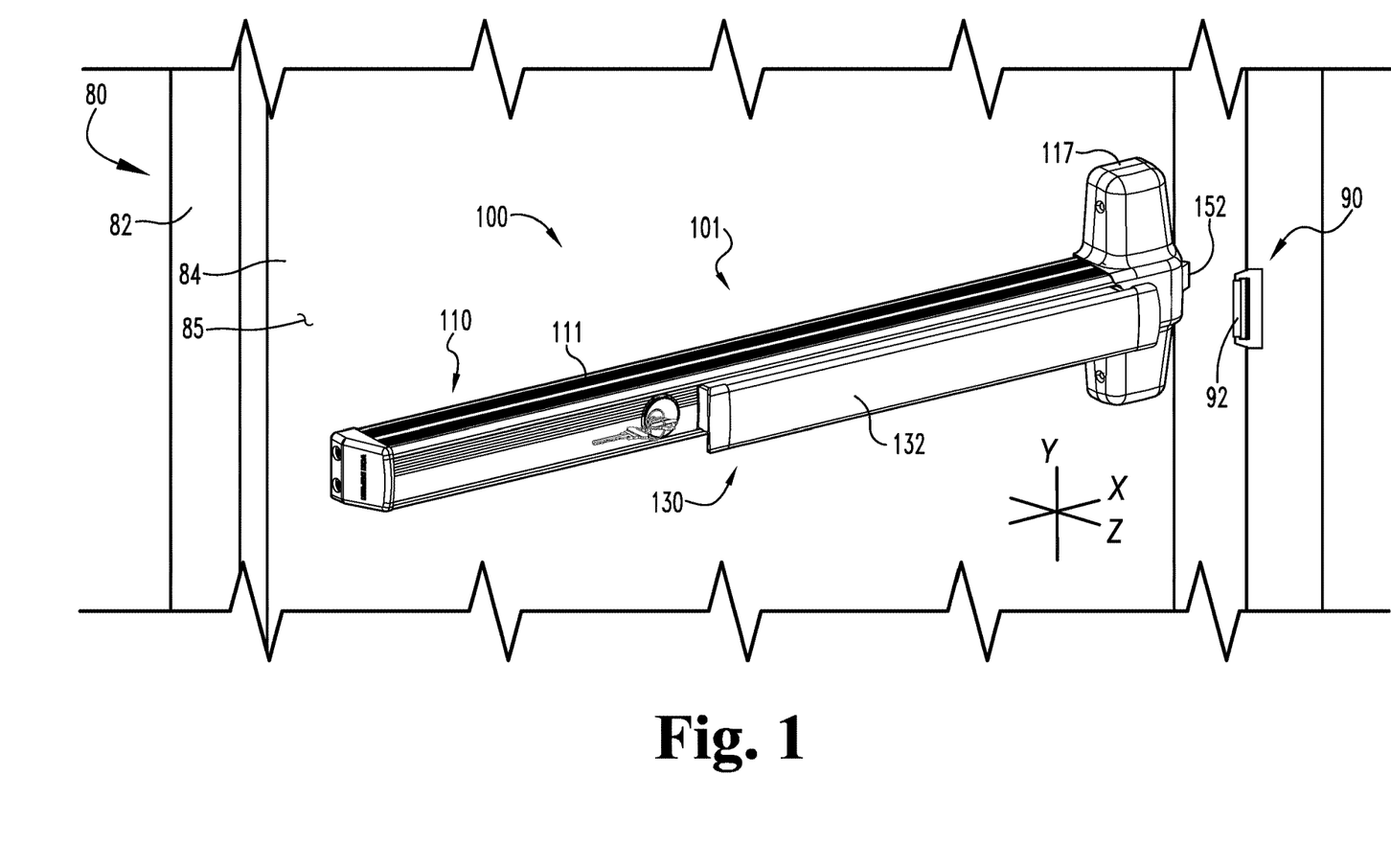
FIG. 1 is an illustration of an exit device installed to a door.

Referring now to FIG. 1, illustrated therein is a closure assembly 80 including a frame 82 and a swinging door 84 pivotally mounted to the frame 82. The door 84 has an interior side face 85 and an opposite exterior side face. The door 84 is mounted to the frame 82 by a set of hinges such that a pushing force on the interior side face 85 urges the door 84 to swing outwardly in an opening direction. An exit device 100 is mounted to the interior side face 85 of the door 84, and is configured to interact with a strike 90 to selectively retain the door 84 in a closed position relative to the frame 82. While other forms are contemplated, the illustrated strike 90 is mounted to the interior side of the frame 82, and includes a roller 92.

Figure 2:
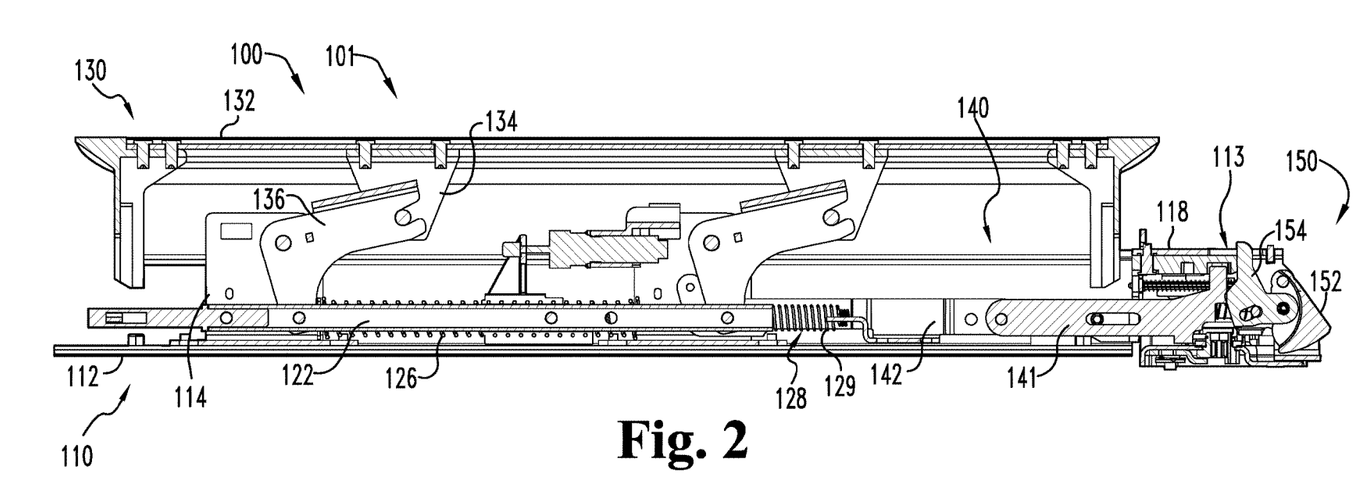
FIG. 2 is a cross-sectional illustration of the exit device.
Figure 3:
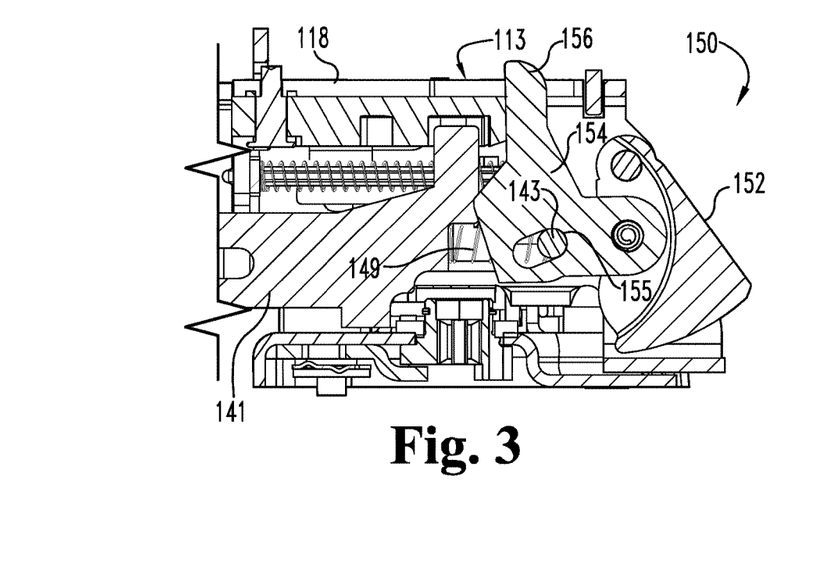
FIG. 3 is a cross-sectional illustration of a portion of the exit device.

With additional reference to FIGS. 2 and 3, the exit device 100 includes a pushbar assembly 101 which may also be referred to as an actuation assembly or actuating assembly. The pushbar assembly 101 includes a mounting assembly 110 configured for mounting to the door 84, a drive assembly 120 including a pushbar mechanism 130, and a latch control assembly 140 operably connected with the drive assembly 120. The exit device 100 further includes a latching mechanism 150 that includes a latchbolt 152, and which is operably connected with the latch control assembly 140. The pushbar mechanism 130 is operable to transition the drive assembly 120 from a deactuated state to an actuated state when manually actuated by a user. Actuation of the drive assembly 120 causes a corresponding actuation of the latch control assembly 140, thereby moving the latching mechanism 150 to a retracted position. With the latching mechanism 150 in the retracted position, the latchbolt 152 is capable of clearing the strike 90 such that the door 84 can be moved from the closed position. As described herein, the exit device 100 is capable of a plurality of operational movements, one or more of which involves retraction and/or extension of the latchbolt 152.

Figure 4:
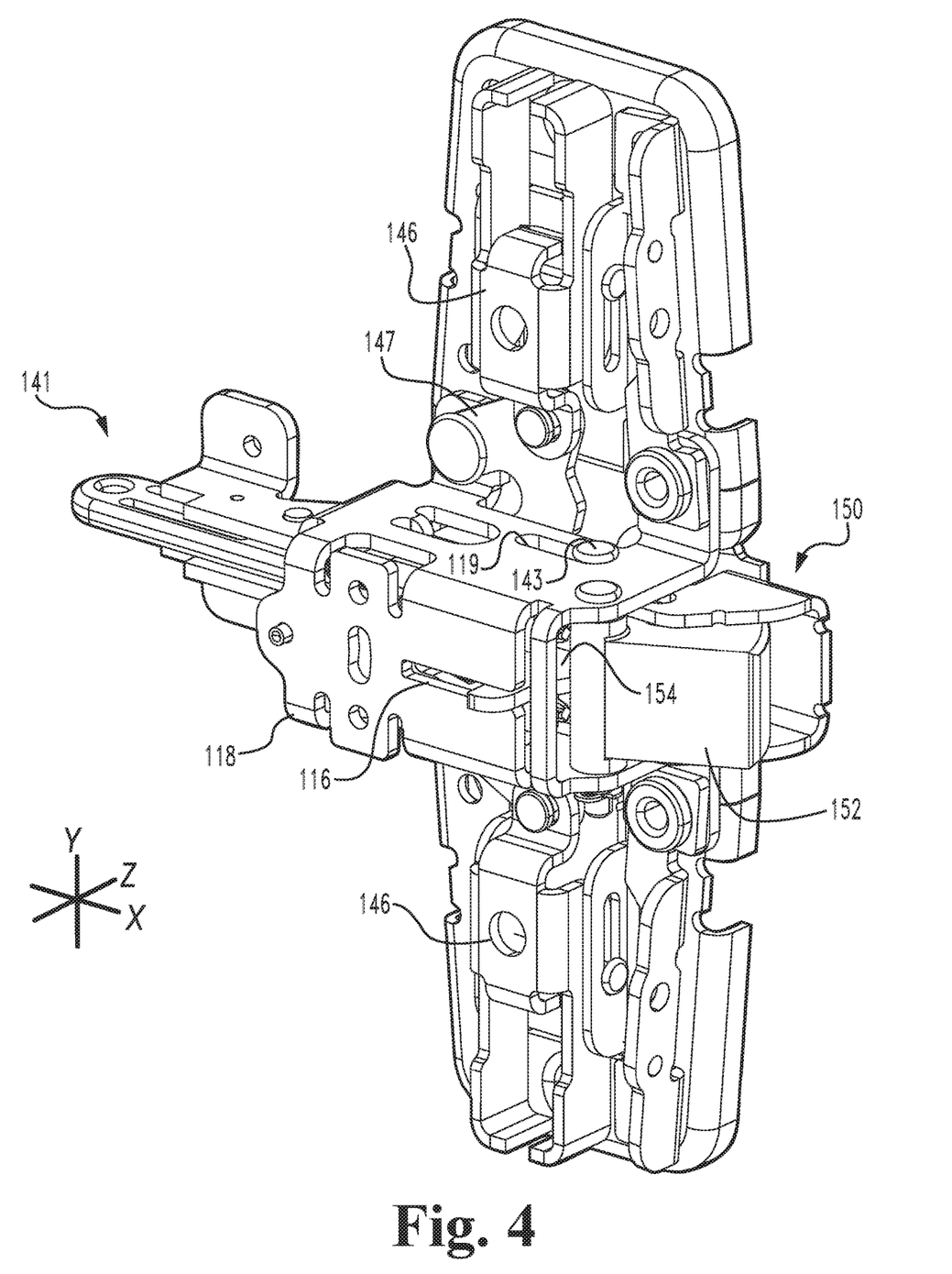
FIG. 4 is a perspective view of a latch control assembly of the exit device.
Figure 5A:
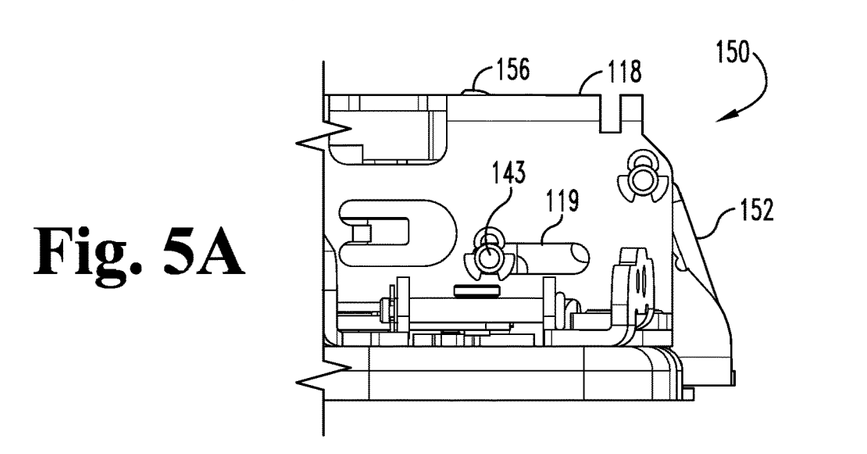
FIGS. 5A, 5B and 5C respectively illustrate a portion of the exit device with a latchbolt in a retracted position, an extended position, and a partially-retracted position.
Figure 5B:
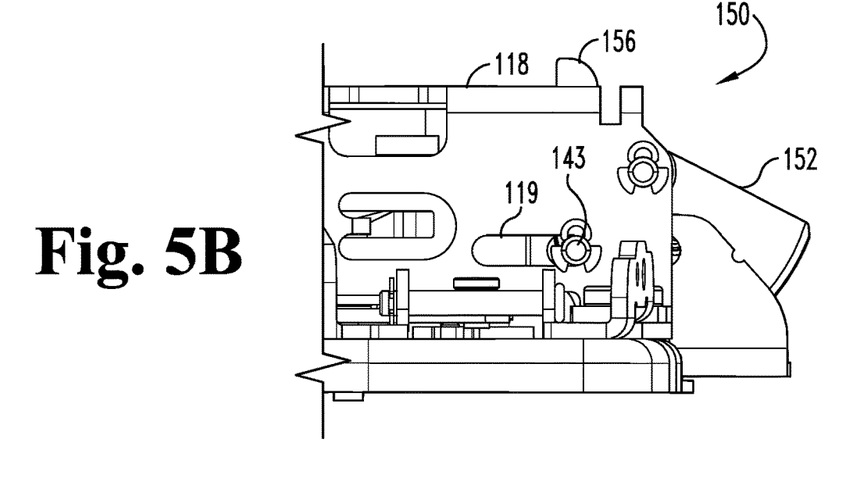
Figure 5C:
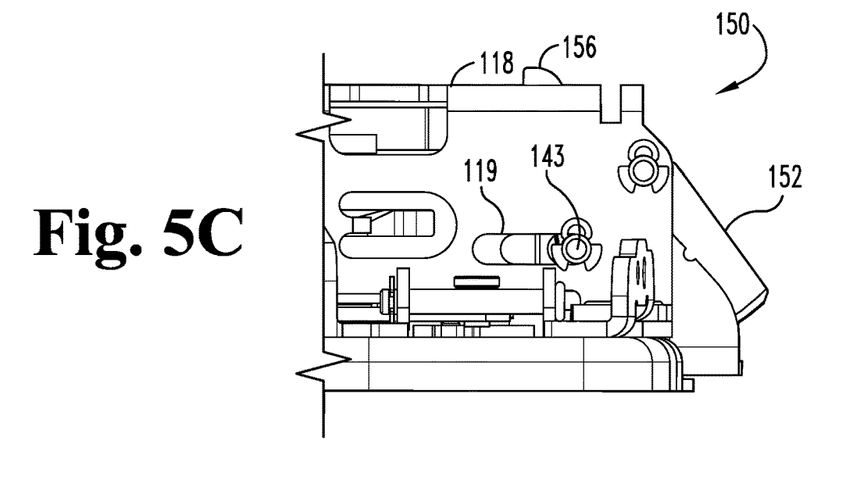

The mounting assembly 110 generally includes an elongated channel member 111, a base plate 112 mounted in the channel member 111, and a pair of bell crank mounting brackets 114 coupled to the base plate 112. The channel member 111 extends in the longitudinal (X) direction, has a width in the transverse (Y) direction, and has a depth in the lateral (Z) direction. Each of the mounting brackets 114 includes a pair of transversely spaced walls that extend laterally away from the base plate 112. The illustrated mounting assembly 110 also includes a header plate 113 positioned adjacent a proximal end of the channel member 111, and a header casing 117 mounted to the header plate 113. The mounting assembly 110 also includes a header bracket 118 that is mounted to the header plate 113 within the header casing 117. As illustrated in FIGS. 4 and 5, the ceiling of the header bracket 118 includes a first guide slot 116, and each sidewall of the header bracket 118 includes a second guide slot 119.

The drive assembly 120 includes the pushbar mechanism 130, a drive bar 122 connected between the pushbar mechanism 130 and the latch control assembly 140, and a return spring 126 engaged with the drive bar 122 and the mounting assembly 110. The return spring 126 biases the drive bar 122 in a distal extending direction, thereby biasing the drive assembly 120 toward its deactuated state. As described herein, the drive assembly 120 is operationally connected with the latch control assembly 140 via a first lost motion connection 128, which may include a spring 129 biasing the latch control assembly 140 toward its deactuated state.

The pushbar mechanism 130 generally includes a manually actuated pushbar 132, a pair of pushbar brackets 134 coupled to the underside the pushbar 132, and a pair of bell cranks 136 operably connecting the pushbar 132 with the drive bar 122. Each bell crank 136 is pivotably mounted to a corresponding one of the bell crank mounting brackets 114, and includes a first arm pivotably connected to a corresponding one of the pushbar brackets 134 and a second arm pivotably connected to the drive bar 122. The pivotal connections may, for example, be provided by pivot pins 103. The pushbar 132 is laterally movable between an extended or deactuated position and a depressed or actuated position, and the bell cranks 136 translate lateral movement of the pushbar 132 to longitudinal movement of the drive bar 122.

With additional reference to FIG. 4, the latch control assembly 140 generally includes a longitudinally-sliding control link 141 connected with the latching mechanism 150, a fork link 142 connected between the control link 141 and the drive assembly 120, and a drive pin 143 mounted to a proximal end portion of the control link 141 and extending through the guide slot 119 of the header bracket 118. The illustrated latch control assembly 140 further includes a pair of laterally-sliding connector links 146 and a pair of pivot cranks 147. The pivot cranks 147 connect the control link 141 with the connector links 146, and translate longitudinal movement of the control link 141 to lateral movement of the connector links 144. As described herein, the latch control assembly 140 is operationally connected with the latching mechanism 150 via a second lost motion connection 148, and a spring 149 biases the latching mechanism 150 toward its deactuated state.

The control link 141, the pin 143, the connector links 146, the pivot cranks 147, and the fork link 142 may alternatively be referred to as control components 140' of the latch control assembly 140. Each of the control components 140' has an extended position and a retracted position, and a corresponding extending direction and retracting direction. Each control component 140' is configured to move in its retracting direction (i.e., toward its retracted position) in response to actuation of the drive assembly 120, and is operable to move in its extending direction (i.e., toward its extended position) in response to deactuation of the drive assembly 120. As will be appreciated, the extending and retracting directions for one component 140' may be different from the extending and retracting directions for another component 140'. By way of example, the extending and retracting directions for the control link 141 and the fork link 142 are longitudinal directions, the extending and retracting directions for the connector links 146 are lateral directions, and the extending and retracting directions for the pivot cranks 147 are rotational directions.

The latching mechanism 150 includes the latchbolt 152, which is pivotably mounted to the header bracket 118 by another pivot pin 106 such that the latchbolt 152 pivots between an extended latching position and a retracted unlatching position. The latching mechanism 150 also includes a retractor 154, which is pivotably coupled with the latchbolt 152 via a pivot pin 153. The retractor 154 is also operationally coupled to the control link 141 via the second lost motion connection 148, and partially defines the second lost motion connection 148. More particularly, the retractor 154 includes an elongated opening 155 through which the pin 143 extends, thereby forming the second lost motion connection 148 between the control link 141 and the retractor 154. The retractor 154 also includes an extension 156, which projects through the first guide slot 116.

While the illustrated latching mechanism 150 includes a latchbolt 152 that is mounted in the header case 117, it is also contemplated that the latching mechanism 150 may take another form. For example, the exit device 100 may include one or more remote latching mechanisms in addition to or in lieu of the illustrated latching mechanism 150. Such remote latching mechanisms may, for example, be provided as a top latch mechanism configured to engage the top jamb of a door frame, and/or as a bottom latch mechanism configured to engage the floor. The remote latching mechanisms may be connected to the connector links 146 via a connector, such as a rod or a cable. In such forms, movement of the connector links 146 in a laterally inward retracting direction (i.e., toward one another) may serve to actuate the remote latching mechanisms.

In the illustrated embodiment, the control components 140' are operationally coupled with one another for joint movement between the extended and retracted positions thereof. As a result, movement of one of the control components 140' causes a corresponding movement of the remaining components 140', and increasing or decreasing the movement speed of one of the components 140' causes a corresponding increase or decrease in the movement speed of the remaining components 140'. Additionally, the latchbolt 152 and the retractor 154 are operationally coupled with one another for joint movement between the extended and retracted positions thereof, and are operationally coupled with the latch control assembly 140 via the second lost motion connection 148.

An opening/closing cycle of the closure assembly 80 may be considered to begin with the door 84 in its closed position and the exit device 100 in its deactuated state. In this state, the drive assembly 120 and the latch control assembly 140 are in the deactuated states thereof, and the latchbolt 152 is extended and engaged with the strike 90, thereby preventing opening of the door 84. In this state, a user may depress the pushbar 132 to actuate the exit device 100 and retract the latchbolt 152. More specifically, depressing the pushbar 132 actuates the drive assembly 120, thereby moving the drive bar 122 distally toward the retracted position thereof. This distal movement of the drive bar 122 is transmitted to the fork link 142 via the first lost motion connection 128, thereby actuating the latch control assembly 140 and retracting the latchbolt 152. This operational movement may be referred to herein as the actuating operational movement, following which the door 84 can be opened.

After opening the door 84, the user may release the pushbar 132 to initiate a deactuating operational movement. Upon release of the pushbar 132, the internal biasing mechanisms of the exit device 100 return the drive assembly 120 to its deactuated state. More specifically, the return spring 126 moves the drive bar 122 proximally toward its extended state, thereby causing the bell cranks 136 to drive the pushbar 132 to its projected position.

With additional reference to FIGS. 5A, 5B and 5C, the proximal movement of the drive bar 122 initiates a latching operational movement, which involves deactuation of the latch control assembly 140 and the latching mechanism 150. This operational movement begins with the latch control assembly 140 in its deactuated actuated state and the latching mechanism 150 in its retracted position (FIG. 5A). As the drive bar 122 moves proximally, the spring 129 of the first lost motion connection 128 urges the fork link 142 in the proximal direction, thereby deactuating the latch control assembly 140 and moving the control components 140' to the deactuated positions thereof (FIG. 5B). As the control link 141 and the pin 143 move in the proximal direction, the spring 149 drives the retractor 154 to return the latching mechanism 150 to its extended position (FIG. 5B).

As the door 84 reaches its partially-closed position, the strike 90 engages the latchbolt 152 and drives the latching mechanism 150 to an intermediate or partially retracted position (FIG. 5C) against the biasing of the spring 149. As a result of the second lost motion connection 148, however, this movement of the latching mechanism 150 does not necessarily drive the pin 143 from its deactuated position. Accordingly, the latch control assembly 140 may remain in its deactuated state during closing of the door 84.

As the door 84 moves from its partially-closed position to its fully-closed position, a relatching operational movement is initiated. Movement of the door 84 from its partially-closed position to its fully-closed position causes the latchbolt 152 to clear the roller 92 of the strike 90. Once the roller 92 is cleared, the return spring 149 drives the retractor 154 proximally to return the latching mechanism 150 to its extended or deactuated position.

It has been found that certain of the above-described operational movements may result in the generation of noise that can be objectionable in certain circumstances. During the latching operational movement, for example, the control components 140' may slide against or impact one another or other components of the exit device 100, such as the mounting assembly 110, the drive assembly 120, and/or the latching mechanism 150. Similarly, during the relatching operational movement, the latching mechanism 150 may slide against or impact other components of the closure assembly 80, such as the latch control assembly 140 and/or the strike 90. However, the exit device 100 is provided with one or more noise reduction mechanisms that reduce the generation of this noise.

Figure 6:
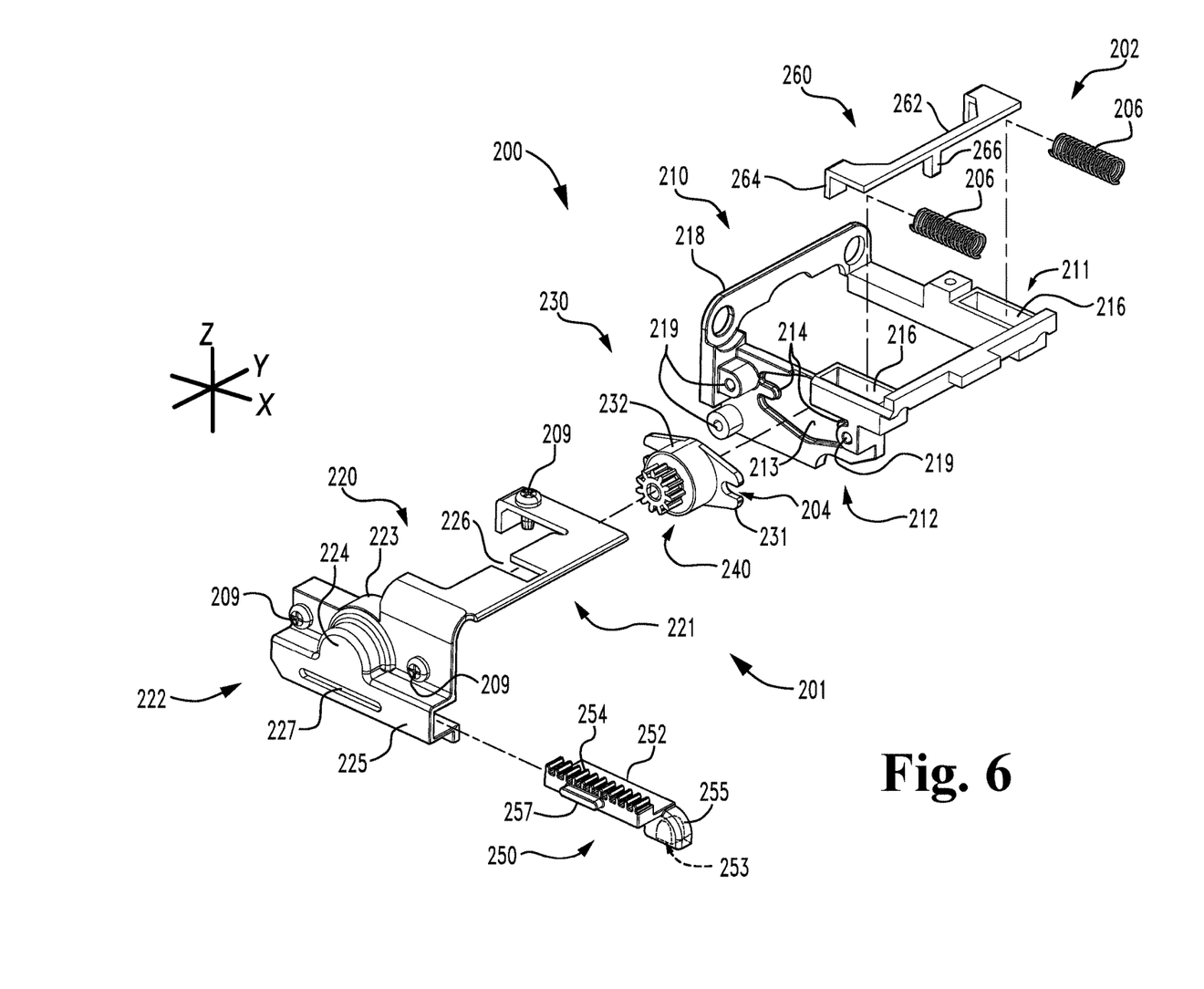
FIG. 6 is an exploded assembly view of a damper module according to certain embodiments.
Figure 7:
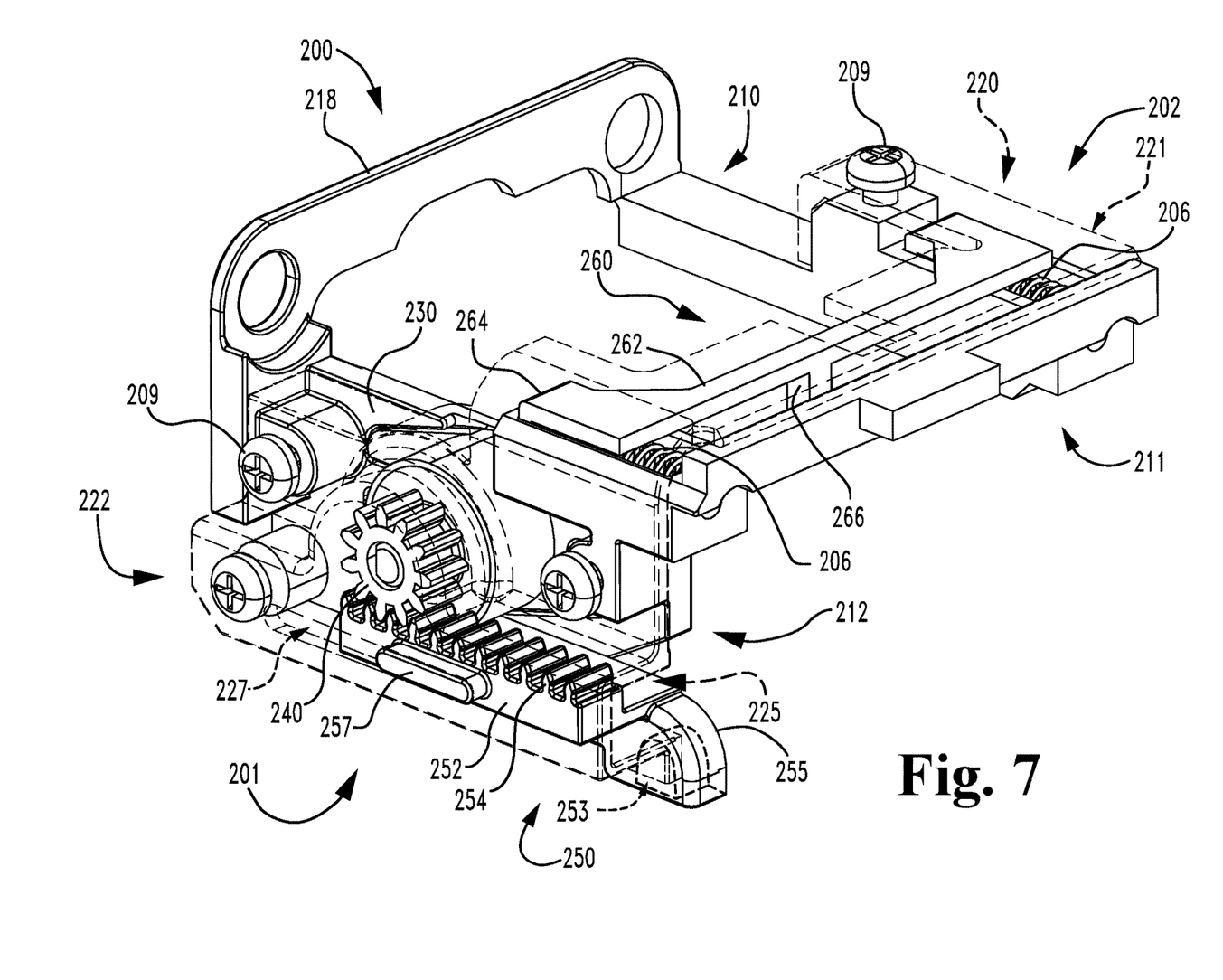
FIG. 7 is a perspective view of the damper module illustrated in FIG. 6.

With reference to FIGS. 6 and 7, illustrated therein is a noise reduction mechanism in the form of a damper module 200, which is configured for use in exit devices such as the exit device 100 illustrated in FIGS. 1-5. In the illustrated form, the damper module 200 is configured as a modular subassembly that can easily be installed to or removed from the exit device 100 by maintenance personnel. In other embodiments, various components of the damper module 200 may be incorporated into the exit device 100 prior to installation, for example at the time of manufacture.

The damper module 200 is configured to reduce the amount of noise generated during at least the latching and relatching operations by slowing the deactuating speeds of the latch control assembly 140 and the latching mechanism 150. The damper module 200 generally includes a mounting bracket 210, a cover or housing 220 mounted to the mounting bracket 210, a rotational damper 230 mounted to the mounting bracket 210 and housed in the housing 220, a rack member 250 slidably mounted to the housing 220 and engaged with a pinion gear 240 of the rotational damper 230, and a slowing arm 260 movably mounted to the mounting bracket 210.

As described herein, the damper module 200 is configured to slow the extension speed of various components of the exit device 100, thereby slowing the extension speed of the latchbolt 152. More particularly, the rotary damper 230 and the rack member 250 cooperate to slow the extension speed of the drive pin 143, thereby slowing the extension speed of the retractor 154 and the latchbolt 152. Additionally, the slowing arm 260 engages the retractor extension 156 to independently slow the extension speed of the retractor 154, thereby further slowing the extension speed of the latchbolt 152. Accordingly, the damper module 200 may alternatively be referred to herein as a latchbolt slowing module 200, the rotary damper 230 and rack member 250 may collectively be referred to herein as a first slowing mechanism 201, and the slowing arm 260 and the biasing members 206 may collectively be referred to herein as a second slowing mechanism 202.

The mounting bracket 210 is configured for mounting to the header bracket 118, and generally includes a laterally-extending first bracket portion 211 and a second bracket portion 212 extending transversely from the first bracket portion 211. The first bracket portion 211 includes a pair of pockets 216 for receiving springs 206, which are engaged with the slowing arm 260 and urge the arm 260 in the distal (X⁻) direction. Formed on a distal end of the first bracket portion 211 is a mounting plate 218 that facilitates attachment of the mounting bracket 210 to the exit device 100. The second bracket portion 212 includes a recess 213 in which a base plate 231 of the rotary damper 230 is seated, and which includes a pair of projections 214 that aid in rotationally coupling the base plate 231 with the mounting bracket 210. The mounting bracket 210 further includes a plurality of mounting apertures 219 that aid in securing the housing 220 to the mounting bracket 210, for example via fasteners 209.

Like the mounting bracket 210, the housing 220 includes a laterally-extending first housing portion 221 and a second housing portion 222 extending transversely from the first housing portion 221. The first housing portion 221 includes a slot 226 which, when the damper module 200 is mounted to the header bracket 118, is aligned with the first guide slot 116 and is operable to receive the extension 156 of the retractor 154. The second housing portion 222 includes a gradated recess sized and shaped to house the rotary damper 230 when the base plate 231 thereof is seated in the recess 213 of the mounting bracket 210. More specifically, the gradated recess includes a first recessed portion 223 operable to receive a body portion 232 of the damper 230 and a second recessed portion 224 operable to receive the pinion gear 240. The second housing portion 222 further includes a channel 225 that is operable to slidably receive a portion of the rack member 250, and which includes a longitudinal guide slot 227 operable to slidably receive a guide projection 257 of the rack member 250.

Figure 8:
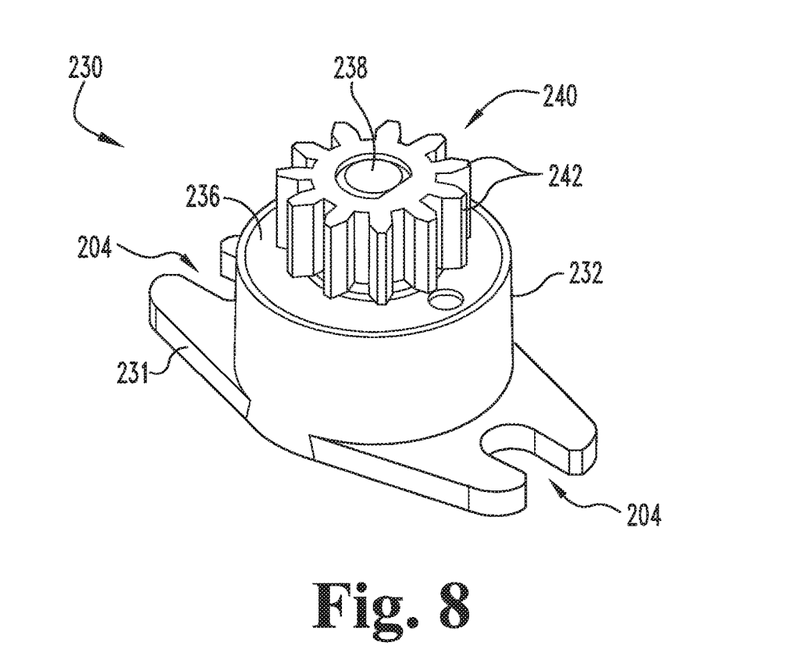
FIG. 8 is a perspective illustration of a rotary damper that may be included in the damper module illustrated in FIGS. 6 and 7.
Figure 9:
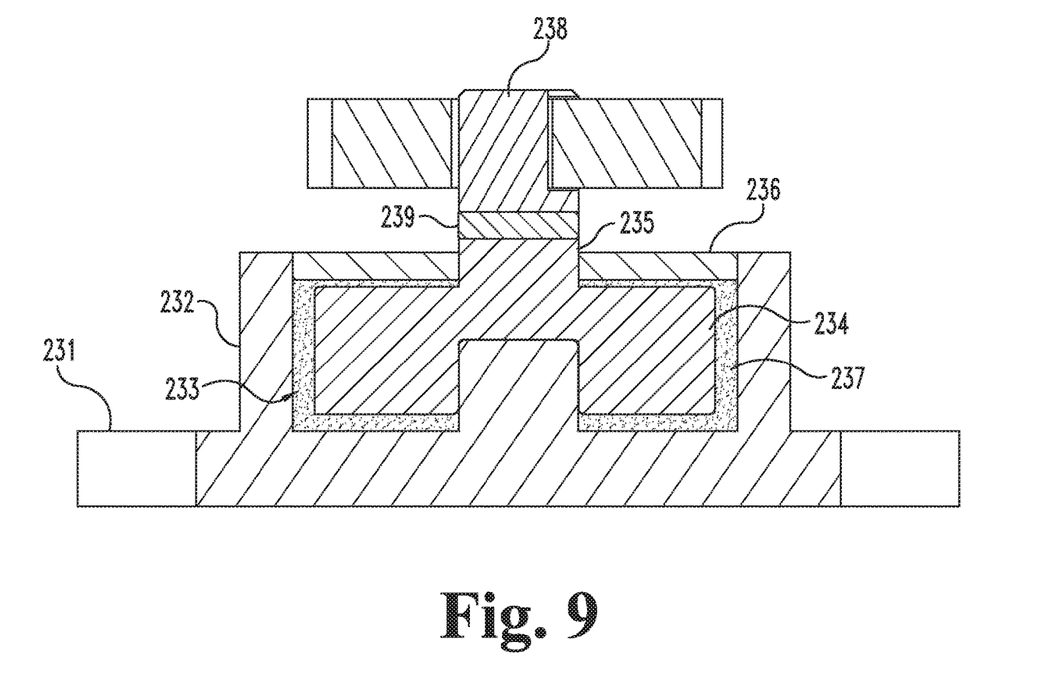
FIG. 9 is a cross-sectional illustration of the rotary damper illustrated in FIG. 8.

With additional reference to FIGS. 8 and 9, the rotary damper 230 generally includes a base plate 231, a stator 232 mounted to the mounting bracket 210, a rotor 234 rotationally mounted to the stator 232. In the illustrated form, the stator 232 defines a chamber 233, and the rotor 234 is mounted within the chamber 233. In other forms, the chamber 233 may be defined within the rotor 234, and the stator 232, may be mounted within the chamber 233. The base plate 231 includes a pair of notches 204 that interface with the projections 214 and facilitate rotational coupling of the stator 232 with the mounting bracket 210. The rotary damper 230 further includes a cap 236 that encloses the chamber 233. The rotor 234 is mounted in the chamber 233, and includes a stem 235 that extends through an opening in the cap 236. The cap 236 cooperates with the stator 232 and the rotor 234 to form a fluid-tight seal for the chamber 233. The sealed chamber 233 is filled with a hydraulic fluid 237 that generates a resistive torque in response to rotation of the rotor 234 relative to the stator 232, such as silicone oil. The stem 235 is engaged with a shaft 238 via a one-way clutch 239 that couples the stem 235 and shaft 238 for joint rotation in one rotational direction while allowing relative rotation of the stem 235 and shaft 238 in the opposite rotational direction. The pinion gear 240 is mounted to the shaft 238 such that the gear 240 is engaged with the rotor 234 via the one-way clutch 239.

The rack member 250 generally includes a gear rack 252 that is engaged with the teeth 242 of the pinion gear 240, and which is formed on a body portion 254 of the rack member 250. The rack member 250 further includes a receiving recess 253 sized and shaped to receive an end portion of the drive pin 143, and a shoulder portion 255 in which the receiving recess 253 is formed. Projecting from the body portion 254 adjacent the gear rack 252 is a guide projection 257, which is received in the guide slot 227 to guide the rack member 250 for sliding movement in the longitudinal directions.

The slowing arm 260 generally includes a central arm portion 262, a pair of tabs 264 formed on opposite sides of the arm portion 262, and a finger 266 projecting from the arm portion 262 in the same direction as the tabs 264. The tabs 264 and the springs 206 are received in the pockets 216 of the mounting bracket 210 such that the springs 206 urge the slowing arm 260 in the distal direction (i.e., toward the mounting plate 218). When installed to the exit device 100, the finger 266 projects toward and/or into the first guide slot 116 and is operable to engage the extension 156 of the retractor 154.

Figure 10:
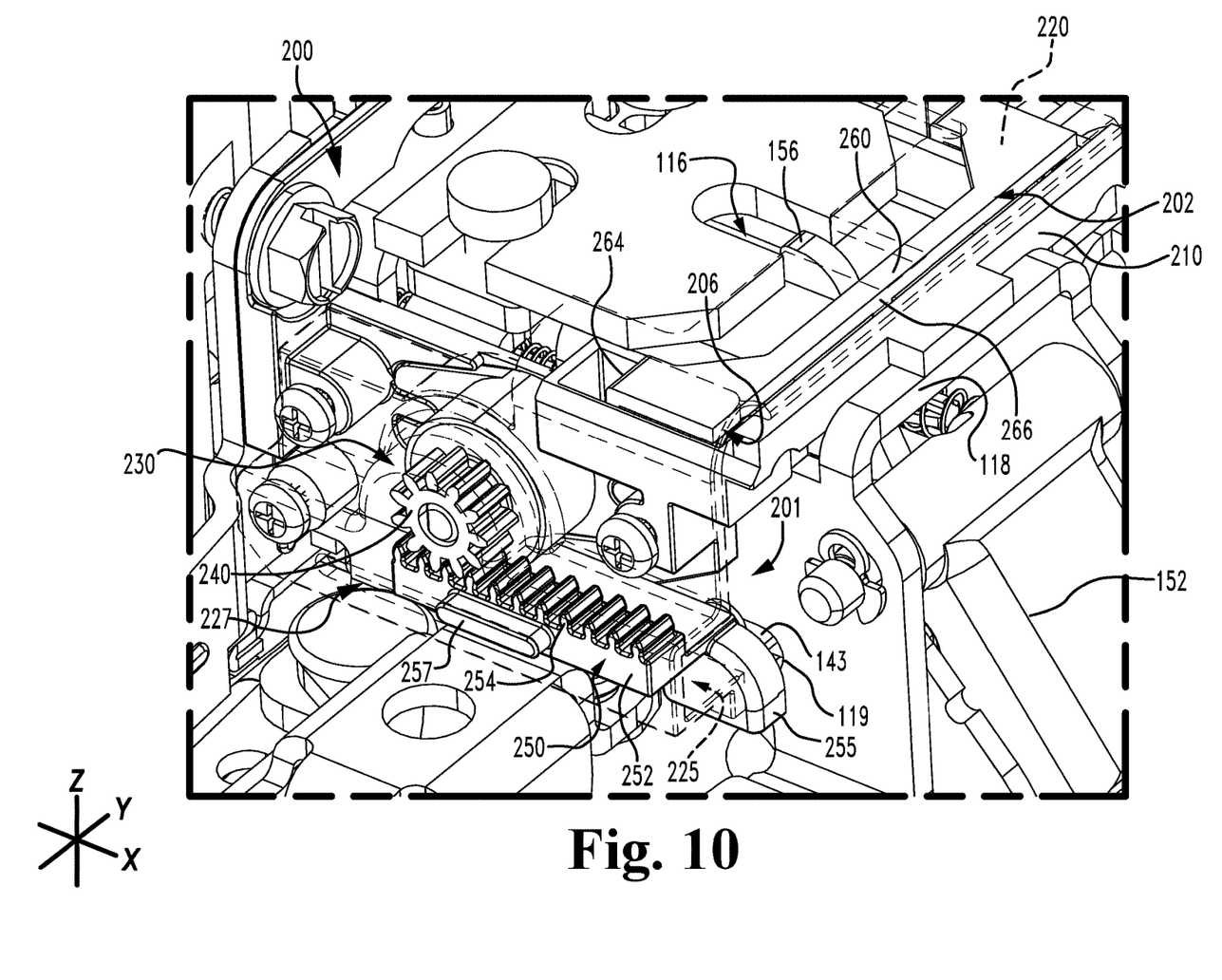
FIG. 10 is a perspective view of the damper module illustrated in FIGS. 6 and 7 as installed to the exit device illustrated in FIGS. 1-4.

FIG. 10 illustrates the damper module 200 installed to the exit device 100. In the interest of more clearly illustrating the internal components of the damper module, the housing 220 is depicted in phantom in FIG. 10. With the damper module 200 installed, the mounting bracket 210 is seated on the header bracket 118, and is secured to the mounting assembly 110 by a pair of screws that pass through the mounting plate 218.

The housing 220 is secured to the mounting bracket 210 via the screws 209 such that the housing 220 at least partially covers the moving components of the damper module 200. For example, the first housing portion 221 at least partially covers the slowing arm 260, and the second housing portion 222 at least partially covers the rotary damper 230 and the rack member 250. More specifically, the recessed portions 223, 224 at least partially cover the rotary damper 230, and the walls of the channel 225 at least partially cover the rack member 250. Additionally, the channel 225 is generally aligned with one of the guide slots 119 formed in the header bracket 118.

The rotary damper 230 is captured between the mounting bracket 210 and the housing 220. As a result, the stator 232 is rotationally coupled with the mounting bracket 210 and the rotor 234 and pinion gear 240 are capable of joint rotation relative to the stator 232.

The rack member 250 is slidably mounted in the channel 225, and one end of the rack member 250 is mounted to the drive pin 143. More specifically, an end portion of the drive pin 143 is seated in the receiving recess 253 such that the shoulder portion 255 is supported by the drive pin 143. With the body portion 254 supported by the floor of the channel 225 and the shoulder portion 255 captured between the drive pin 143 and lip of the channel 225, the rack member 250 is constrained to movement in the longitudinal directions in which the drive pin 143 travels. Additionally, with the guide projection 257 received in the guide slot 227, the guide components 227, 257 cooperate to aid in limiting the travel of the rack member 250 in the longitudinal (X) directions.

The slowing arm 260 is positioned adjacent the ceiling of the header bracket 118, and the finger 266 extends into the guide slot 116 and increases the surface area at which the extension 156 can contact the slowing arm 260. Additionally, the tabs 264 and the biasing members 206 are seated in the pockets 216 such that the slowing arm 260 is biased toward the retractor extension 156. Thus, the biasing members 206 bias the slowing arm 260 in the retracting direction of the extension 156 and resist movement of the slowing arm 260 in the extending direction of the extension. In the illustrated form, the biasing members 206 are provided in the form of springs 206. In other embodiments, the biasing members 206 may be provided in another form, such as unidirectional linear dampers.

With the damper module 200 installed, operation of the exit device 100 may proceed along the lines set forth above. During actuation of the exit device 100, the drive pin 143 moves in a distal actuating direction from its deactuated position (FIG. 5B) to its actuated position (FIG. 5A). This movement of the drive pin 143 causes relative movement of the rack member 250 and the pinion gear 240, thereby causing the rack member 250 to drive the pinion gear 240 in an actuating rotational direction. The configuration of the one-way clutch 239 is selected such that this rotation of the pinion gear 240 is not transmitted to the rotor 234. As a result, a resistive torque is not generated by the rotary damper 230, and the actuating movement of the latch control assembly 140 is not materially altered by the first slowing mechanism 201.

As a result of the actuating movement of the drive pin 143, the retractor 154 and the extension 156 thereof are likewise driven from their deactuated positions (FIG. 5B) to their actuated positions (FIG. 5A). This movement of the retractor 154 enables the biasing members 206 to drive the slowing arm 260 in the distal direction such that the tabs 264 engage end walls of the pockets 216. Due to the fact that the second slowing mechanism 202 does not resist the actuating movement of the retractor 154, the actuating movement of the latching mechanism 150 is not adversely affected by the second slowing mechanism 202.

During deactuation of the exit device 100, the drive pin 143 moves in a proximal deactuating direction from its actuated position (FIG. 5A) to its deactuated position (FIG. 5B). This movement of the drive pin 143 causes relative movement of the rack member 250 and the pinion gear 240, thereby causing the rack member 250 to drive the pinion gear in a deactuating rotational direction. The configuration of the one-way clutch 239 is selected such that this rotation of the pinion gear 240 is transmitted to the rotor 234. As a result, the rotary damper 230 generates a resistive torque that resists rotation of the pinion gear 240 in the deactuating direction. This resistance is transmitted to the drive pin 143 via the rack member 250, thereby slowing the deactuating movement of the latch control assembly 140 and the extension speed of the latching mechanism 150.

During deactuating movement of the drive pin 143, the return spring 149 drives the retractor 154 and the extension 156 thereof from their actuated positions (FIG. 5A) to their deactuated positions (FIG. 5B). As the retractor 154 moves toward its deactuated position, the extension 156 travels along the guide slot 116 and engages the slowing arm 260. To reduce the noise generated as a result of this impact, the slowing arm 260 may be formed of or coated with a vibration-damping material. Additionally or alternatively, a damping pad may be mounted to the portions of the arm 262 and/or the finger 266 that are impacted by the extension 156. With the extension 156 in contact with the slowing arm 260, further movement of the retractor 154 in its deactuating direction is resisted by the biasing members 206. As a result, the second slowing mechanism 202 further slows the extending or deactuating speed of the latching mechanism 150.

As is evident from the foregoing, the slowing mechanisms 201, 202 independently slow the deactuating speed of the latch control assembly 140 and the latching mechanism 150 during the latching operational movement. More particularly, the first slowing mechanism 201 slows the deactuating speed of the latch control assembly 140 by slowing the movement of the drive pin 143, which also causes a corresponding slowing of the deactuating speed of the latching mechanism 150. Additionally, the second slowing mechanism 202 independently slows the deactuating speed of the latching mechanism 150 by providing an additional resistance that slows the deactuating speed of the retractor 154. Furthermore, while the slowing mechanisms 201, 202 provide for slowing of the deactuating speeds of the latch control assembly 140 and latching mechanism 150, neither slowing mechanism 201, 202 provides material resistance to the actuation of those components. As a result, the amount of force that must be exerted by a user in order to retract the latchbolt 154 is not adversely affected.

During the relatching operational movement, the second slowing mechanism 202 functions in a manner substantially similar to that described above. As the latchbolt 152 is driven from its extended position (FIG. 5B) to its partially-retracted position (FIG. 5C) under the urging of the roller 92 of the strike 90, the retractor 154 and the extension 156 thereof are likewise driven from their deactuated positions toward their actuated positions. This movement of the retractor 154 enables the biasing members 206 to drive the slowing arm 260 in the distal direction such that the tabs 264 engage end walls of the pockets 216. Due to the fact that the second slowing mechanism 202 does not resist this movement of the retractor 154, the amount of force that must be imparted by the strike roller 92 in order to drive the latchbolt 152 to its partially-retracted position is not increased.

As the latchbolt 152 clears the strike roller 92, the return spring 149 drives the retractor 154 to move the latchbolt 152 toward its extended position. As the retractor 154 and the extension 156 move from their partially-retracted positions (FIG. 5C) to their actuated positions (FIG. 5B), the extension 156 travels along the guide slot 116 and engages the slowing arm 260. With the extension 156 in contact with the slowing arm 260, further movement of the retractor 154 in its deactuating direction is resisted by the biasing members 206. As a result, the second slowing mechanism 202 slows the extending or deactuating speed of the latching mechanism 150 during the relatching operational movement.

As is evident from the foregoing, the damping module 200 is capable of slowing the deactuating or extending speeds of various components of the exit device 100. Those skilled in the art will readily appreciate that this slowing of the extension speeds can reduce the amount of noise generated during the operation of the exit device 100. For example, slowing the deactuating speed of the latch control assembly 140 can reduce vibrations and noise resulting from metal-to-metal contact, such as sliding, grinding, or impact vibrations and noises. Slowing the extension speed of the latchbolt 154 itself can similarly reduce vibrations resulting from contact between internal components of the exit device 100, as well as vibrations resulting from contact between the latchbolt 154 and the strike 90. Thus, in slowing the deactuating speeds of various components of the exit device 100, the damper module 200 may facilitate quieter operation of the exit device 100, particularly during latching and relatching operations.

Although the damping module 200 has been illustrated and described as being configured for use with a rim-type exit device 100 (i.e., one in which a single latching mechanism 150 is mounted to the pushbar assembly 101), it is also contemplated that the damping module 200 may be used in combination with other forms of exit devices, such as those including remote latching mechanisms. Such exit devices typically include one or more latching mechanisms that are positioned remotely from the pushbar assembly 101 (e.g., at the top and/or the bottom of the door 84), and which are connected to the pushbar assembly 101 via vertical connectors.

In vertical exit devices, the connectors may be surface-mounted (i.e., mounted to the interior side face 85 of the door 84), or may be concealed (i.e., mounted in channels formed within the door 84), and typically take the form of rods or cables. Regardless of the form, the connectors are typically connected to the connector links 146 of the latch control assembly 140 such that actuation of the drive assembly 120 causes a corresponding actuation of the remote latching mechanisms. When so connected, the remote latching mechanism and the latch control assembly 140 actuate and deactuate in unison with one another. Thus, in slowing the deactuation speed of the latch control assembly 140, the damper module 200 is capable of slowing the deactuating speeds of the remote latching mechanisms.

While the invention has been illustrated and described in detail in the drawings and foregoing description, the same is to be considered as illustrative and not restrictive in character, it being understood that only the preferred embodiments have been shown and described and that all changes and modifications that come within the spirit of the inventions are desired to be protected. It should be understood that while the use of words such as preferable, preferably, preferred or more preferred utilized in the description above indicate that the feature so described may be more desirable, it nonetheless may not be necessary and embodiments lacking the same may be contemplated as within the scope of the invention, the scope being defined by the claims that follow. In reading the claims, it is intended that when words such as "a," "an," "at least one," or "at least one portion" are used there is no intention to limit the claim to only one item unless specifically stated to the contrary in the claim. When the language "at least a portion" and/or "a portion" is used the item can include a portion and/or the entire item unless specifically stated to the contrary.

What is claimed is:

1. A system, comprising:
   a mounting assembly configured for mounting to a door;
   an actuation assembly movably mounted to the mounting assembly;
   a drive member operably connected with the actuation assembly, wherein the drive member is configured to move in a drive member actuating direction in response to actuation of the actuation assembly, and wherein the drive member is operable to move in a drive member deactuating direction in response to deactuation of the actuation assembly;
   a retractor operably connected with the drive member, wherein the retractor is configured to move in a retractor actuating direction in response to movement of the drive member in the drive member actuating direction, and wherein the retractor is operable to move in a retractor deactuating direction in response to movement of the drive member in the drive member deactuating direction;
   a latchbolt operably connected with the retractor, the latchbolt having an extended position and a retracted position, wherein the latchbolt is configured to move in a retracting movement toward the retracted position in response to movement of the retractor in the retractor actuating direction, and wherein the latchbolt is operable to move in an extending movement toward the extended position in response to movement of the retractor in the retractor deactuating direction;
   a first slowing mechanism operable to engage the drive member, wherein the first slowing mechanism is configured to slow movement of the drive member in the drive member deactuating direction, thereby slowing movement of the retractor in the retractor deactuating direction, thereby slowing the extending movement of the latchbolt; and
a second slowing mechanism operable to engage the retractor, wherein the second slowing mechanism is configured to slow movement of the retractor in the retractor deactuating direction independently of the first slowing mechanism, thereby further slowing the extending movement of the latchbolt; and
wherein the first slowing mechanism includes a gear rack mounted to one of the drive member or the mounting assembly, a pinion gear engaged with the gear rack and mounted to the other of the drive member or the mounting assembly, and a damper configured to slow relative movement of the gear rack and the pinion gear in a linear direction during the extending movement of the latchbolt, thereby slowing movement of the drive member relative to the mounting assembly during the extending movement of the latchbolt; and
wherein the gear rack and the pinion gear are constrained to relative movement in the linear direction, and wherein the second slowing mechanism comprises a slowing arm that is constrained to movement in the linear direction.

2. The system of claim 1, wherein the damper is a unidirectional damper configured to slow relative movement of the gear rack and the pinion gear during the extending movement of the latchbolt without slowing relative movement of the gear rack and the pinion gear during the retracting movement of the latchbolt.

3. The system of claim 1, wherein the gear rack is mounted to the drive member, and wherein the pinion gear is rotatably mounted to the mounting assembly.

4. The system of claim 1, wherein the damper is a rotary damper including a rotor and a stator, wherein the pinion gear is mounted to the rotor, and wherein the stator is rotationally coupled with the other of the drive member or the mounting assembly.

5. The system of claim 4, wherein the gear rack is mounted to the drive member, and wherein the pinion gear is rotatably mounted to the mounting assembly via the rotary damper.

6. The system of claim 5, wherein the rotary damper further comprises a one-way clutch connected between the rotor and the pinion gear, wherein the one-way clutch is configured to rotationally decouple the rotor and the pinion gear for relative rotation as the gear rack drives the pinion gear in a first rotational direction corresponding to the drive member actuating direction, and wherein the one-way clutch is configured to rotationally couple the rotor and the pinion gear for joint rotation as the gear rack drives the pinion gear in a second rotational direction corresponding to the drive member deactuating direction.

7. The system of claim 6, further comprising a rack member including the gear rack, and a housing mounted to the mounting assembly, wherein the housing includes a channel and a guide slot connected with the channel, wherein the rack member is slidably received in the channel, and wherein the rack member includes a guide projection received in the guide slot, the guide projection and the guide slot cooperating to guide the rack member for movement in the guide member actuating direction and the guide member deactuating direction.

8. The system of claim 1, wherein the second slowing mechanism comprises the slowing arm and a biasing member biasing the slowing arm in a first slowing arm direction corresponding to the retractor actuating direction and resisting movement of the slowing arm in a second slowing arm direction corresponding to the retractor deactuating direction.

9. The system of claim 8, further comprising:
an exit device, the exit device including the mounting assembly, the actuating assembly, the drive member, the retractor, and the latchbolt, wherein the mounting assembly includes a header bracket to which the latchbolt is pivotably mounted; and
a latchbolt slowing module comprising:
a mounting bracket configured for mounting to the header bracket;
the damper, wherein the damper is a rotary damper comprising a rotor, a stator, and a fluid configured to resist relative rotation of the rotor and the stator, wherein the stator is mounted to the mounting bracket;
the slowing arm, wherein the slowing arm is movably mounted to the mounting bracket;
the biasing member, wherein the biasing member is engaged between the mounting bracket and the slowing arm;
the pinion gear, wherein the pinion gear is engaged with the rotor of the rotary damper; and
a rack member including the rack gear, wherein the rack member is configured for coupling with the drive member; and
wherein the latchbolt slowing module is a modular add-on for the exit device.

10. The system of claim 9, wherein the stator of the damper further comprises a base plate, wherein the mounting bracket includes a recess having a geometry corresponding to a footprint of the base plate, wherein the base plate is seated in the recess, wherein the latchbolt slowing module further comprises a housing including a channel and a guide slot connected with the channel, and wherein the rack member is seated in the channel and includes a guide protrusion received in the guide slot.

11. The system of claim 9, wherein the rotary damper is a unidirectional rotary damper configured to generate a resistive torque slowing rotation of the pinion gear relative to the stator in response to rotation of the pinion gear in a first rotational direction, and to not generate the resistive torque in response to rotation of the pinion gear in a second rotational direction opposite the first rotational direction.

12. A damper module configured for use with a latchbolt assembly including a latchbolt, the latchbolt assembly having a latchbolt-retracting movement involving retraction of the latchbolt and a latchbolt-extending movement involving extension of the latchbolt, the damper module comprising:
a mounting bracket;
a rotary damper mounted to the mounting bracket, the rotary damper comprising:
a stator rotationally coupled with the mounting bracket;
a rotor mounted for rotation relative to the stator;
a chamber defined at least in part by one of the rotor or the stator, wherein the other of the rotor or the stator is mounted at least partially within the chamber;
a hydraulic fluid disposed in the chamber, wherein the hydraulic fluid is configured to generate a resistive torque in response to relative rotation of the rotor and the stator, the resistive torque resisting the relative rotation of the rotor and the stator;
a pinion gear operable to rotate in a first pinion gear direction and an opposite second pinion gear direction, wherein the pinion gear is mounted to the rotor such that rotation of the pinion gear in at least the first pinion gear direction causes a corresponding rotation of the rotor relative to the stator;

a rack member comprising a gear rack engaged with the pinion gear such that movement of the rack member in a first rack member direction drives the pinion gear to rotate in the first pinion gear direction and movement of the rack member in an opposite second rack member direction drives the pinion gear to rotate in the second pinion gear direction;

a slowing arm movably mounted to the mounting bracket, wherein the slowing arm is operable to move in a first slowing arm direction and an opposite second slowing arm direction; and a biasing member engaged with the slowing arm, the biasing member biasing the slowing arm in the second slowing arm direction and resisting movement of the slowing arm in the first slowing arm direction;

wherein the rack member is configured for mounting to the latchbolt assembly such that the latchbolt-extending movement moves the rack member to drive the pinion gear in the first pinion gear direction, thereby causing the corresponding rotation of the rotor relative to stator, thereby causing the hydraulic fluid to generate the resistive torque, thereby slowing rotation of the rotor and slowing movement of the rack member in a linear direction such that the rack member is operable to slow the latchbolt-extending movement of the latchbolt assembly;

wherein the slowing arm is configured to engage the latchbolt assembly such that the latchbolt-extending movement drives the slowing arm in the first slowing arm direction, thereby causing the biasing member to resist movement of the slowing arm in the first slowing arm direction such that the slowing arm is operable to slow the latchbolt-extending movement of the latchbolt assembly; and wherein the rack member is constrained to movement in the linear direction, and wherein the slowing arm is also constrained to movement in the linear direction.

13. The damper module of claim 12, wherein the rotary damper further includes a one-way clutch, wherein the pinion gear is connected to the rotor via the one-way clutch, wherein the one-way clutch is configured to permit the pinion gear to rotate in the second pinion gear direction without causing a corresponding rotation of the rotor relative to the stator.

14. The damper module of claim 12, wherein the chamber is defined at least in part by the stator, and wherein the rotor is rotatably mounted at least partially within the chamber.

15. The damper module of claim 12, wherein the biasing member comprises a linear hydraulic damper.

16. The damper module of claim 12, further comprising a housing mounted to the mounting bracket, the housing and the rack member defining a guide including a slot and a projection received in the slot, wherein the guide is configured to constrain the rack member to movement in the linear direction and to limit movement of the rack member in the linear direction.

17. A method of slowing an extension speed of a latchbolt assembly, wherein the latchbolt assembly includes a mounting assembly, a latchbolt movably mounted to the mounting assembly, a retractor having a latchbolt-extending motion and a latchbolt-retracting motion, and a drive member having a retractor-extending motion and a retractor-retracting motion, the method comprising:

slowing the retractor-extending motion of the drive member, wherein slowing the retractor-extending motion of the drive member comprises:
mounting a first gear member to the drive member;
mounting a second gear member to the mounting assembly such that teeth of the first gear member mesh with teeth of the second gear member; and
engaging a damper with one of the first gear member or the second gear member such that the damper resists relative movement of the first gear member and the second gear member in a first linear direction of relative movement;

wherein the retractor-extending motion of the drive member causes relative movement of the first gear member and the second gear member in the first linear direction of relative movement such that the damper resists the relative movement of the first gear member and the second gear member, thereby slowing the retractor-extending motion of the drive member; and slowing the latchbolt-extending motion of the retractor, wherein slowing the latchbolt-extending motion of the retractor comprises:
movably mounting a slowing arm to the mounting assembly; and
with a biasing member, resisting movement of the slowing arm in a first slowing arm direction and biasing the slowing arm in a second slowing arm direction opposite the first slowing arm direction;

wherein the latchbolt-extending motion of the retractor causes the retractor to drive the slowing arm in the first slowing arm direction such that the biasing member resists movement of the slowing arm, thereby slowing the latchbolt-extending motion of the retractor; and wherein the relative movement of the first gear member and the second gear member is constrained to movement in the first linear direction, and wherein the slowing arm is also constrained to movement in the first linear direction.

18. The method of claim 17, wherein one of the first gear member or the second gear member comprises a pinion gear, wherein the other of the first gear member or the second gear member comprises a rack gear, and wherein the first direction of relative movement includes a first rotational direction of the pinion gear.

19. The method of claim 18, wherein the damper comprises a rotary damper configured to slow rotation of the pinion gear in the first rotational direction.

20. The method of claim 17, wherein the first gear member comprises a rack gear, the second gear member comprises a pinion gear, and the damper comprises a rotary damper including a rotor and a stator;

wherein mounting the first gear member to the drive member comprises mounting the rack gear to the drive member for linear movement with the drive member; and wherein the method comprises mounting the pinion gear to the rotor and mounting the stator to the mounting assembly, thereby mounting the second gear member to the mounting assembly and engaging the damper with the second gear member such that the damper resists rotation of the pinion gear.

\* \* \* \* \*